United States Patent Office 3,238,813
Patented Mar. 8, 1966

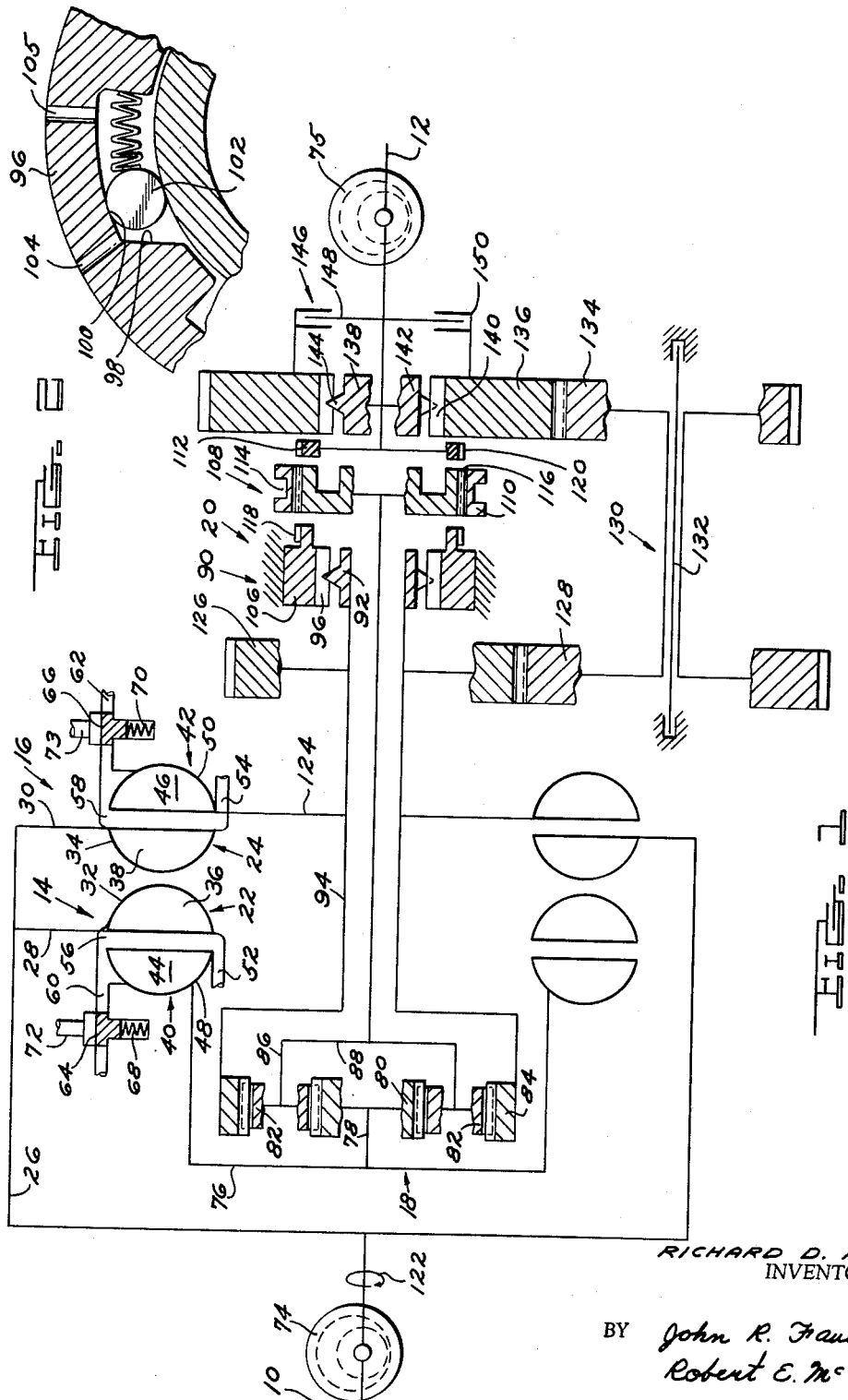

3,238,813
TRANSMISSION
Richard D. Moan, Dearborn, Mich., assignor to Ford Motor Company, Dearborn, Mich., a corporation of Delaware
Filed Oct. 11, 1962, Ser. No. 229,818
20 Claims. (Cl. 74—677)

This invention relates to a transmission for a motor vehicle. More particularly, it relates to the construction of transmission gearing variably combined with a plurality of hydrodynamic drive devices of the fill and empty type. The various combinations are preferably controlled by mechanical and fluid pressure actuated coupling devices to provide a plurality of forward drives, neutral, a reverse drive, and hill braking.

The invention has particular use in motor vehicle type installations where low cost and freedom from repair are important considerations. The invention provides these advantages in many ways. First, controllable fluid couplings are utilized eliminating the need for additional friction devices to control the transmission of torque from known types of constantly filled fluid couplings, for example. Secondly, mechanical overrunning clutches and brakes are utilized to establish different drive conditions through the transmission in substantially a fail-safe manner. And thirdly, all forward speed drives are established without the use of fluid pressure actuated friction coupling devices.

The invention thus provides a three-speed automatic transmission that is economical to build, is easy to assemble or disassemble, and is relatively free of adjustments.

Therefore, it is an object of the invention to provide a transmission of a construction combining a plurality of selectively operable driving members with a plurality of gearing, and controlling the same primarily by the use of mechanical coupling devices to provide a plurality of drives.

It is another object of the invention to provide a transmission having a plurality of input shafts selectively combined with planetary and other type gearing controlled primarily by mechanical overrunning and positive jaw type couplings.

It is a further object of the invention to provide a three-speed automatic transmission combining a number of selectively controlled fluid couplings of the fill and empty type with planetary and countershaft type gearing, and controlling the same in an efficient manner by the use of mechanical overrunning and jaw type clutches and brakes.

Other objects, features and advantages will become apparent upon reference to the succeeding detailed description of the invention, and to the drawings illustrating the preferred embodiment thereof; wherein, FIGURE 1 is a schematic illustration of a transmission embodying the invention; and, FIGURE 2 is an enlarged cross sectional view of a portion of a detail of FIGURE 1.

FIGURE 1 shows, diagrammatically, a transmission having an input shaft 10 and an output shaft 12. Shaft 10 is connected to a suitable source of power (not shown), such as the engine of a motor vehicle, for example. The two shafts are connected through the agency of two fluid couplings 14 and 16, a planetary gear set 18, and a reduction drive gear train 20.

Each of couplings 14 and 16 has a pump or impeller 22, 24 drive connected to shaft 10 by an annular shell 26 having connecting flanges 28 and 30. The flanges are secured to the outer annular pump shrouds 32 and 34, which support circumferentially spaced pump blades 36, 38. The impellers are situated in back-to-back relation, each facing a turbine 40, 42. The turbines have blades 44, 46 shaped to cooperate with those of the pumps, and secured within outer shrouds 48 and 50. The impeller and turbine shrouds and blades together define a toroidal fluid flow path for the transmission of torque from the impellers to the turbines in a known manner.

Each of the couplings in this instance is of the fill and empty type; that is, it is filled or emptied of fluid, as desired, to vary the transmisison of torque from the impeller to the turbine from zero to a maximum and vice versa. Both couplings may be filled with fluid under pressure at their inner peripheries from inlet lines 52 and 54. They discharge through outlets 56 and 58 at their outer peripheries into vent lines 60 and 62. Passage through each of the vent lines is controlled by a radially movable valve illustrated schematically at 64, 66. The valves rotate with the shell flanges, and are normally biased by springs 68, 70 to a position opening the vent line. The valves are moved to close the lines by fluid pressure admitted through signal lines 72, 73 to act on the top of the valve. The springs may be dispensed with, if desired, since centrifugal force acting on the valve is normally sufficient to maintain it in an open position in the absence of fluid pressure in the signal lines.

The couplings are supplied with fluid under pressure from two pumps 74, 75 driven by the input and output shafts 10 and 12, respectively. The pumps also supply the fluid under pressure necessary for the actuation of the other fluid pressure actuated devices to be described.

Each of the couplings, when activated individually, drives a different portion of the transmission gearing to provide two separate forward reduction drives, and one reverse drive, as well as hill or coast braking. When activated simultaneously, the couplings cause a direct drive to be established from the input to the output shaft.

The turbine 40 of coupling 14 is connected by a flange 76 to a power input shaft 78 for the planetary gear set 18. Shaft 78 has a sun gear 80 secured to it. This gear set is of the simple planetary type having a number of spaced pinions 82 (only two shown) meshing with sun gear 80 and an annulus or ring gear 84. The pinions 82 are rotatably mounted upon shafts 86 secured to a carrier 88 constituting the output or driven member of the gear set.

Ring gear 84 normally acts as the reaction member to provide a forward reduction drive through the gear set. It is held against rotation in a reverse or counterclockwise direction by means of a one-way overrunning brake 90, which, however, permits it to rotate freely in a clockwise direction. The inner race 92 of brake 90 is press fitted or otherwise secured over one end of a sleeve shaft 94 having its opposite end fixed to the ring gear. Brake 90 is of the spring apply—fluid pressure release type. It has an outer race 96 fixedly secured within a stationary sleeve member 106 secured to a portion of the transmission casing.

The brake is illustrated only schematically in FIGURE 1; however, its details of construction are shown more clearly in FIGURE 2. The outer race 96 is formed with a recess 98 having a radially converging outer wall 100. The recess contains a roller or pin 102 spring biased in one direction into engagement with the wall to prevent counterclockwise rotation of the inner race 92, while permitting clockwise rotation. The brake is rendered ineffective to prevent rotation in any direction by the admission of fluid under pressure through a port 104 to move the roller or pin to an inoperative position. The brake could, of course, also be rendered effective by fluid pressure, if desired, to prevent rotation in the one direction by the admission of fluid to recess 98 through a port 105.

The carrier 88 of gear set 18 is connected to output shaft 12 by means of a double-acting dog or jaw type clutch 108 secured to the carrier. The dog clutch has a sleeve 110 slidably splined to its outer periphery. The sleeve is moved axially to the right or left of the neutral position shown in FIGURE 1 to engage the carrier either with the stationary member 106, or an annular flange member 112 extending from output shaft 12. Engaging the clutch sleeve and member 106 forms a connection for establishing a reverse drive through the transmission, as will appear more clearly later. Engaging the sleeve with the member 112 forms a connection in the forward drive train. The sleeve 110 is reciprocated axially by a shifter fork (not shown) engaging a groove 114 in the sleeve. The sleeve has internal teeth 116 adapted to engage either teeth 118 formed on the stationary member 106, or teeth 120 formed on the member 112.

As thus far described, therefore, activation of fluid coupling 14 alone will cause the input shaft to drive sun gear 80 in a clockwise direction indicated by the arrow 122. If the carrier 88 at this time is connected to output shaft 12 by dog clutch 108, it will be held stationary due to the initial resistance to movement of the shaft. Accordingly, ring gear 84 attempts to rotate counterclockwise, which is prevented by the one-way brake 90. The carrier 88 will therefore rotate forwardly or clockwise, slowly rotating shaft 12 at a speed reduced from that of the input shaft 10.

Turning now to the drive by the coupling 16, turbine 42 has a flange 124 fixed to the sleeve shaft 94. Also fixed to the shaft is the driving gear 126 of the reduction drive gear train 20. Shaft 94, therefore, not only acts at times to connect ring gear 84 to brake 90, but also is a power input shaft for the ring gear, and gear 126. Gear 126 meshes with a gear 128 formed as one portion of a cluster gear assembly 130. The gear assembly is rotatably mounted upon a countershaft 132 having its ends fixed within the transmission housing. The other smaller diameter gear 134 of the cluster meshes with a larger diameter gear 136 constituting the output of the reduction drive gear train. Gear 136 is drivingly connected to the output shaft 12 through a one-way overrunning clutch 138 having its outer race 140 secured within the gear.

The clutch 138 is of a known type having an inner race 142 radially separated from the outer race by a number of circumferentially spaced sprags or rollers 144. The inner race is fixed to the output shaft 12. The one-way clutch permits overrun movement of the output shaft in a clockwise direction relative to gear 136, while providing a drive of the output shaft by the gear at other times.

A fluid pressure actuated friction disc clutch 146 is also provided to prevent the clockwise overrun of shaft 12 under certain operating conditions, such as during coast of the vehicle, or when it is desired to establish a reverse drive. The clutch has an internal annular disc 148 splined or otherwise connected to shaft 12 and alternating with a plurality of spaced annular discs 150 secured to gear 136. Engagement of the clutch 146 therefore bypasses the one-way clutch 138, rendering it inoperative as such.

The filling of coupling 16 and emptying of coupling 14 causes the output shaft to be driven by the reduction drive gear train 20 alone, the planetary gear set 18 at this time idling freely. Filling both couplings provides a dual power input to the planetary gear set to provide a direct drive to the output shaft, the reduction gear drive train idling at this time.

More specifically, in operation, the transmission is conditioned for Neutral or no-drive by emptying couplings 14 and 16 and moving dog clutch 108 to the neutral position shown in FIGURE 1. Accordingly, no drive is transmitted from input shaft 10 to either gear set.

First and Low speed forward drive is established by moving valve 64 to block line 60 thereby permitting the filling of coupling 14 from line 52, and moving dog clutch 108 to connect carrier 88 to output shaft 12. The one-way brake 90 at this time is spring applied. Accordingly, clockwise rotation of input shaft 10 and impeller 22 rotates turbine 40 and sun gear 80 clockwise. With carrier 88 stationary at this time, ring gear 84 attempts to rotate counterclockwise, but is prevented from doing so by the one-way brake 90. Carrier 88 therefore rotates clockwise slowly at a rate depending upon the reduction established by the gear set 18.

Second speed forward drive is established by emptying coupling 14 and filling coupling 16, the other connection remaining the same as in first or low speed drive. Clockwise rotation of input shaft 10 and pump 24 rotates turbine 42 clockwise to rotate drive gear 126 clockwise, one-way brake 90 overrunning at this time. Gears 128 and 134 are rotated counterclockwise to rotate gear 136 clockwise engaging or locking up one-way clutch 138. Output shaft 12 is therefore driven in a forward or clockwise direction at a speed dependent upon the reduction established by the relative sizes of the gears in gear train 20. Gear set 18 idles at this time.

Coast or Hill braking is provided in this speed range by the engagement of clutch 146 to positively lock up one-way clutch 138 against overrun. Clockwise drive by output shaft 12 drives gear 136 in the same direction to drive shaft 94 and turbine 42 clockwise against the fluid resistance in the coupling 16 and the resistance to faster clockwise movement of the pump 42 and input shaft 10.

Third speed or Direct forward drive is established by filling both couplings 14 and 16 simultaneously. Accordingly, clockwise rotation of impellers 22 and 24 by the input shaft cause sun gear 80 and ring gear 84 to be driven substantially at the same speed thereby locking up gear set 18 to drive carrier 88 and output shaft 12 substantially at engine speed. One-way brake 90 and one-way clutch 138 overrun at this time.

Reverse drive is established by moving dog clutch 108 to connect the carrier to the stationary member 106, filling coupling 14, engaging clutch 146, and releasing brake 90 by supplying fluid under pressure through conduit 104 of the brake. Clockwise rotation of input shaft 10 and impeller 22 therefore rotates sun gear 80 forwardly to rotate pinions 82 counterclockwise about the stationary carrier 88. Ring gear 84 is thus rotated reversely or in a counterclockwise direction to drive shaft 12 in the same direction through the power path consisting of shaft 94, gears 126, 128, 134, 136, and clutch 146, at a speed determined by the compound reduction through both gear set 18 and the reduction drive gear train 20.

From the foregoing, therefore, it will be seen that the invention provides a three-speed automatic transmission that is economical to manufacture, and one that has a long service life due to its simplified construction and control.

While the invention has been illustrated in its preferred embodiment in the figures, it will be clear to those skilled in the art to which the invention pertains that many changes and modifications may be made thereto without departing from the scope of the invention.

I claim:
1. A transmission having an input shaft, an output shaft, and means connecting said shafts for providing a plurality of forward drives, said means including a plurality of hydrodynamic drive devices and a plurality of gear sets each having a plurality of rotatable members, said hydrodynamic devices each including a plurality of torque transmitting elements, means connecting one of the elements of each of said devices to said input shaft and another of the said elements of one of said devices to a rotatable member of each of said gear sets, further means connecting a further element of another of said devices to another member of one of said gear sets, clutch means drivingly connecting each of said gear sets to said output shaft, and control means associated with each of said drive devices for selectively rendering them effective or ineffective to transmit torque from said input shaft to said gear sets.

2. A transmission having an input shaft, an output shaft, and means connecting said shafts for providing a plurality of drives, said means including a plurality of hydrodynamic drive devices and a plurality of gear sets each having a plurality of rotatable members, said hydrodynamic devices each including a plurality of torque transmitting elements, means connecting one of the elements of each of said devices to said input shaft and another of said elements of one of said devices to a rotatable member of each of said gear sets, further means connecting a further element of another of said devices to another member of one of said gear sets, other connecting means drivingly connecting each of said gear sets to said output shaft, selectively operable control means associated with each of said drive devices, each selectively operable at any speed of said input shaft to render the drive device associated therewith effective or ineffective to transmit torque from said input shaft to said gear sets, and an overrunning device for a member of one of said gear sets conditioning said latter gear set for one phase of operation.

3. A transmission having an input shaft, an output shaft, and means connecting said shafts for providing a plurality of drives, said means including a plurality of fluid couplings and a plurality of gear sets each having a plurality of rotatable members, said couplings each having a rotatable pump connected to said input shaft and a turbine, means connecting the turbine of one of said couplings to a rotatable member of each of said gear sets, means connecting the turbine of another of said couplings to another member of one of said gear sets, connecting means drivingly connecting each of said gear sets to said output shaft, selectively operable control means associated with each of said couplings, each selectively operable at any speed of said input shaft to render the coupling associated therewith effective or ineffective to transmit torque from said input shaft to said gear sets, and an overrunning device for a member of one of said gear sets conditioning said latter gear set for one phase of operation.

4. A transmission having an input shaft, an output shaft, and means connecting said shafts for providing a plurality of drives, said mean including a plurality of fluid couplings and planetary and countershaft type gearing, each of said gearing having a plurality of rotatable members, said couplings each having a rotatable pump connected to said input shaft and a turbine, means connecting the turbine of one of said couplings to a rotatable member of each of said gearing, further means connecting the turbine of another of said couplings to another member of one of said gearing, other connecting means drivingly connecting each of said gearing to said output shaft, control means associated with each of said couplings for selectively rendering them effective or ineffective to transmit torque from said input shaft to said gearing, and a one-way brake for holding a member of said planetary gearing against rotation in one direction to condition said planetary gearing for a reduction drive, said other connecting means including a one-way clutch between said output shaft and said countershaft gearing for at times effecting a drive of said output shaft by said countershaft gearing.

5. A transmission having an input shaft, an output shaft, and means connecting said shafts for providing a plurality of drives, said means including a plurality of fluid couplings and a planetary gear set and a reduction drive gear train each having drive, driven and other gear members, said gear train including a countershaft rotatably mounting a cluster gear assembly including spaced integral gears meshed with the reduction gear train drive and driven members, said couplings each having a rotatable pump connected to said input shaft and a turbine, means connecting the turbine of one of said couplings to the reduction gear train drive member and to one member of said planetary gear set, further means connecting the turbine of another of said couplings to the drive member of said planetary gear set, other connecting means drivingly connecting the driven members of said planetary gear set to said output shaft, and control means associated with each of said couplings for selectively rendering them effective or ineffective to transmit torque from said input shaft to said gear set and gear train, and a separate overrunning device associated with said gear set and gear train conditioning said planetary gear set and gear train for a drive therethrough to said output shaft.

6. A transmission having an input shaft, an output shaft, and means connecting said shafts for providing a plurality of drives, said means including a plurality of fluid couplings and a planetary gear set and a reduction gear train each having drive, driven and other gear members, said gear train including a countershaft rotatably mounting a cluster gear assembly comprising spaced integral gears meshed with the reduction gear train drive and driven members, said couplings each having a rotatable pump connected to said input shaft and a turbine, means connecting the turbine of one of said couplings to the reduction gear train drive member and to one member of said planetary gear set, means connecting the turbine of another of said couplings to the drive member of said planetary gear set, other connecting means drivingly connecting each of said driven members to said output shaft, control means associated with each of said couplings for selectively rendering them effective or ineffective to transmit torque from said input shaft to said gearing, and a one-way brake at times holding said one member of said planetary gear set against rotation in one direction to condition said planetary gear set for a reduction drive, said other connecting means including a one-way clutch between said output shaft and said reduction gear train driven member at times effecting a drive of said output shaft by said reduction gear train.

7. A transmission having an input shaft, an output shaft, and means connecting said shafts for providing a plurality of drives, said means including a plurality of fluid couplings and a planetary gear set and a reduction gear train each having drive, driven and other gear members, said gear train including a countershaft rotatably mounting a cluster gear assembly including spaced integral gears meshed with the reduction gear train drive and driven members, said couplings each having a rotatable pump connected to said input shaft and a turbine, means connecting the turbine of one of said couplings to the reduction gear train drive member and to one member of said planetary gear set, means connecting the turbine of another of said couplings to the drive member of said planetary gear set, other connecting means drivingly connecting each of said driven members to said output shaft, control means associated with each of said couplings for selectively rendering them effective or ineffective to transmit torque from said input shaft to said gearing, a one-way brake for holding said one member of said planetary gear set against rotation in one direction to condition said planetary gearing for a reduction drive, said other connecting means including a one-way clutch between said output shaft and said reduction gear train driven member for at times effecting a drive of said output shaft by said reduction gear train, and engageable means between said output shaft and reduction gear train for rendering said last named one-way device inoperative as a one-way device to establish a different drive through said transmission.

8. A transmission having an input shaft, an output shaft, and means connecting said shafts for providing a plurality of drives, said means including a plurality of fluid couplings and a planetary gear set and a reduction gear train each having drive, driven and other gear members, said gear train including a countershaft rotatably mounting a cluster gear assembly including spaced integral gears meshed with the reduction gear train drive and driven members, said couplings each having a rotatable pump connected to said input shaft and a turbine, means connecting the turbine of one of said couplings to the reduction gear train drive member and to one member of said planetary gear set, means connecting the turbine of another of said couplings to the drive member of said planetary gear set, other connecting means drivingly connecting each of said driven members to said output shaft, control means associated with each of said couplings for selectively rendering them effective or ineffective to transmit torque from said input shaft to said gearing, a one-way brake for holding said one member of said planetary gear set against rotation in one direction to condition said planetary gearing for a reduction drive, said other connecting means including a one-way clutch between said output shaft and said reduction gear train driven member at times effecting a drive of said output shaft by said reduction gear train, and a clutch for connecting said reduction gear train driven member and output shaft together for unitary rotation in either direction to provide a different drive through said transmission.

9. A transmission having an input shaft, an output shaft, and means connecting said shafts for providing a plurality of drives, said means including a plurality of fluid couplings and a planetary gear set and a reduction gear train each having drive, driven and other gear members, said gear train including a countershaft rotatably mounting a cluster gear assembly including spaced integral gears meshed with the reduction gear train drive and driven members, said couplings each having a rotatable pump connected to said input shaft and a turbine, means connecting the turbine of one of said couplings to the reduction gear train drive member and to one member of said planetary gear set, means connecting the turbine of another of said couplings to the drive member of said planetary gear set, other connecting means drivingly connecting each of said driven members to said output shaft, control means associated with each of said couplings for selectively rendering them effective or ineffective to transmit torque from said input shaft to said gearing, a releasable one-way brake for holding said one member of said planetary gear set against rotation in one direction to condition said planetary gearing for a forward reduction drive, and releasable to permit rotation of said one member in said one direction, means to release said brake, said other connecting means including a one-way clutch between said output shaft and said reduction gear train driven member at times effecting a forward drive of said output shaft by said reduction gear train, a clutch for connecting said reduction gear train driven member and output shaft together for unitary rotation in either direction to provide a different drive through said transmission, dog clutch means operatively connected to the planetary gear set driven member for a nonrotatable sliding movement with respect thereto between a plurality of positions, means for holding said engageable means stationary in one position, and means connecting said dog clutch means and said output shaft in another position, the movement of said dog clutch means to said one position and the release of said one-way brake and the engagement of said clutch and the rendering effective of selective ones of said plurality of couplings providing a reverse drive from said input to said output shafts.

10. A transmission having an input shaft, an output shaft, and means connecting said shafts for providing a plurality of drives, said means including first and second fluid couplings of the fill and empty type and a planetary gear set and countershaft gearing, said planetary gear set having sun and pinion and ring gears and a planet carrier, said countershaft gearing comprising a reduction drive gear train having drive and driven gear members and a countershaft rotatably mounting a cluster gear assembly having spaced integral gears meshed with said drive and driven members, said couplings each having a rotatable pump connected to said input shaft and a turbine, means connecting the turbine of said first coupling to said drive member and to said ring gear, means connecting the turbine of said second coupling to said sun gear, means for filling and emptying said couplings for selectively rendering them effective or ineffective to transmit torque from said input shafts to said gear sets, clutch means separately drivingly connecting the carrier and driven member to said output shaft, said clutch means including a one-way overrunning clutch between said driven member and said output shaft effecting a forward drive of said shaft from said reduction gear train upon lockup of said one-way clutch, a selectively operable one-way overrunning brake secured to said ring gear when operative preventing reverse rotation of said ring gear to condition said planetary gear set for a reduction drive, said clutch means also including a dog clutch operatively connected to said carrier for a nonrotatable sliding movement with respect thereto between a plurality of positions, one position engaging said carrier and said output shaft to establish a plurality of forward drives upon the selective operation of said one-way brake and fluid couplings and one-way clutch, clutch means directly connecting said output shaft and driven member bypassing said one-way clutch, a stationary brake member, the movement of said dog clutch to another position engaging said brake member to condition said transmission for a reverse drive upon engagement of said clutch means and the rendering operative of said second coupling and the rendering inoperative of said one-way brake.

11. A transmission having a plurality of input shafts, an output shaft, and means connecting said shafts in a plurality of paths for providing a plurality of drives, said means comprising planetary and countershaft gearing, each of said gearing having a plurality of rotatable members, means connecting one of said input shafts to a rotatable member of each of said gearing, means connecting another of said input shafts to another member of one of said gearing, other connecting means drivingly connecting each of said gearing to said output shaft, a one-way brake at times holding a member of said planetary gearing against rotation in one direction to condition said planetary gearing for a reduction drive, said other connecting means including a one-way clutch between said output shaft and said countershaft gearing at times effecting a drive of said output shaft by said countershaft gearing, the selective drive of selective ones alone or all of said input shafts together providing a plurality of different drives through said gearing.

12. A transmission having a plurality of input shafts, an output shaft, and means connecting said shafts for providing a plurality of drives, said means including a planetary gear set and a reduction drive gear train each having drive, driven and other gear members, said gear train including a countershaft rotatably mounting a cluster gear assembly including spaced integral gears meshed with the reduction gear train drive and driven members, means connecting one of said input shafts to the reduction gear train drive member and to one member of said planetary gear set, means connecting another of said input shafts to the drive member of said planetary gear set, other connecting means drivingly connecting the driven member of said gear set to said output shaft, and a separate overrunning device associated with said gear set and gear train conditioning said planetary gear set and gear train for a drive therethrough to said output shaft, the selective drive of selective ones alone or all of said input shafts together providing a plurality of different drives through said gearing.

13. A transmission having a plurality of input shafts, an output shaft, and means connecting said shafts for providing a plurality of drives, said means including a planetary gear set and a reduction gear train each having drive, driven and other gear members, said gear train including a countershaft rotatably mounting a cluster gear assembly including spaced integral gears meshed with the reduction gear train drive and driven members, means connecting one of said input shafts to the reduction gear train drive member and to one member of said planetary gear set, means connecting another of said input shafts to the drive member of said planetary gear set, other connecting means drivingly connecting each of said driven members to said output shaft, a one-way brake for holding said one member of said planetary gear set against rotation in one direction to condition said planetary gearing for a reduction drive, said other connecting means including a one-way clutch between said output shaft and said reduction gear train driven member for at times effecting a drive of said output shaft by said reduction gear train, the selective drive of selective ones alone or all of said input shafts together providing a plurality of different drives through said gearing.

14. A transmission having a plurality of input shafts, an output shaft, and means connecting said shafts for providing a plurality of drives, said means including a planetary gear set and a reduction gear train each having drive, driven and other gear members, said gear train including a countershaft rotatably mounting a cluster gear assembly including spaced integral gears meshed with the reduction gear train drive and driven members, means connecting one of said input shafts to the reduction gear train drive member and to one member of said planetary gear set, means connecting another of said input shafts to the drive member of said planetary gear set, other connecting means drivingly connecting each of said driven members to said output shaft, a one-way brake for holding said one member of said planetary gear set against rotation in one direction to condition said planetary gearing for a reduction drive, said other connecting means including a one-way clutch between said output shaft and said reduction gear train driven member for at times effecting a drive of said output shaft by said reduction gear train, and engageable means between said reduction gear train drive member and said output shaft rendering one of said one-way devices inoperative as a one-way device to establish a different drive through said transmission, the selective drive of selective ones alone or all of said input shafts together providing a plurality of different drives through said gearing.

15. A transmission having a plurality of input shafts, an output shaft, and means connecting said shafts for providing a plurality of drives, said means including a planetary gear set and a reduction gear train each having drive, driven and other gear members, said gear train including a countershaft rotatably mounting a cluster gear assembly including spaced integral gears meshed with the reduction gear train drive and driven members, means connecting one of said input shafts to the reduction gear train drive member and to one member of said planetary gear set, means connecting another of said input shafts to the drive member of said planetary gear set, other connecting means drivingly connecting each of said driven members to said output shaft, a one-way brake for holding said one member of said planetary gear set against rotation in one direction to condition said planetary gearing for a reduction drive, said other connecting means including a one-way clutch between said output shaft and said reduction gear train driven member at times effecting a drive of said output shaft by said reduction gear train, and a clutch for connecting said reduction gear train driven member and output shaft together for unitary rotation in either direction to provide a different drive through said transmission, the selective drive of selective ones alone or all of said input shafts together providing a plurality of different drives through said gearing.

16. A transmission having a forwardly rotating input shaft, an output shaft, and means connecting said shafts, said means including a planetary gear set and a reduction gear train each having drive, driven and other gear members, said gear train including a countershaft rotatably mounting a cluster gear assembly including spaced integral gears meshed with the reduction gear train drive and driven members, means connecting said input shaft to the drive member of said planetary gear set, means connecting other members of said gear set and gear train together, releasable brake means for holding one of said gear set members stationary to condition said gear set for a drive therethrough, clutch means at times drivingly connecting each of said driven members to said output shaft to provide a drive thereof including a one-way clutch between said output shaft and said reduction gear train driven member, said clutch means including a clutch connecting said reduction gear train driven member and output shaft together for unitary rotation in either direction to provide a different drive through said transmission, said clutch means also including dog clutch means operatively connected to the planetary gear set driven member for a nonrotatable sliding movement with respect thereto between a plurality of positions, means for holding said dog clutch means stationary in one position, the movement of said dog clutch means to said one position and the release of said brake means and the engagement of said clutch upon the forward drive of said input shaft providing a reverse drive of said output shaft.

17. A transmission having a plurality of forwardly rotating input shafts, an output shaft, and means connecting said shafts for providing a plurality of drives and a reverse drive, said means including a planetary gear set and countershaft gearing, said planetary gear set having sun and pinion and ring gears and a planet carrier, said countershaft gearing comprising a reduction drive gear train drive and driven gear members and a countershaft rotatably mounting a cluster gear assembly having spaced integral gears meshed with said drive and driven members, means connecting one of said input shafts to said drive member and to said ring gear, means connecting another of said input shafts to said sun gear, clutch means separately drivingly connecting the carrier and driven member to said output shaft, said clutch means including a one-way overrunning clutch between said driven member and said output shaft effecting a forward drive of said shaft from said reduction gear train upon lockup of said one-way clutch, a selectively operable one-way overrunning brake secured to said ring gear when operative preventing reverse rotation of said ring gear to condition said planetary gear set for a reduction forward drive, means for rendering said brake inoperable and thereby permitting reverse rotation of said ring gear, said clutch means also including a dog clutch operatively connected to said carrier for a nonrotatable sliding movement with respect thereto between a plurality of positions, one position engaging said carrier and said output shaft to establish a plurality of forward drives upon the rotation of selective ones alone of said input shafts or all together and the selective operation of said one-way brake and one-way clutch, said clutch means also including other clutch means directly connecting said output shaft and driven member bypassing said one-way clutch, a stationary brake member, the movement of said dog clutch to another position engaging said dog clutch and brake member to condition said transmission for a reverse drive upon engagement of said other clutch means and the rotation of one of said input shafts alone and the rendering inoperative of said one-way brake.

18. A transmission having an input shaft, an output shaft, and means connecting said shafts for providing a plurality of drives, said means including a plurality of selectively fillable hydrodynamic drive devices and a plurality of gear sets each having a plurality of rotatable members, said hydrodynamic devices each including a plurality of torque transmitting elements, means connecting one of the elements of each of said devices to said input shaft and another of the said elements of one of said devices to a rotatable member of each of said gear sets, further means connecting a further element of another of said devices to another member of one of said gear sets, overrunning brake means operable at times to hold one of the members of one gear set stationary to condition said latter gear set for a reduction drive, and means drivingly connecting a member of each of said gear sets to said output shaft, each of said drive devices being selectively fillable at will at any speed of said input shaft to render it effective to transmit torque, the selective filling of selected ones of said drive devices in different combinations together with the operation at times to said brake means establishing a plurality of different drives through said transmission.

19. A transmission having an input shaft, an output shaft, and means connecting said shafts for providing a plurality of drives, said means including a plurality of selectively fillable hydrodynamic drive devices and gearing having a plurality of rotatable members, said hydrodynamic devices each including a plurality of torque transmitting elements, means connecting one of the elements of each of said devices to said input shaft and another of the said elements of one of said devices to a plurality of rotatable members of said gearing, further means connecting a further element of another of said devices to another member of said gearing, overrunning brake means automatically operable at times to hold a member of said gearing stationary to condition said gearing for a reduction drive therethrough, and means drivingly connecting members of said gearing to said output shaft, each of said drive devices being selectively fillable at will at any speed of said input shaft to render it effective to transmit torque, the selective filling of selected ones of said drive devices in different combinations together with the automatic operation at times of said brake means establishing a plurality of different drives through said transmission.

20. A transmission having an input shaft, an output shaft, and means connecting said shafts for providing a plurality of drives, said means including a plurality of selectively fillable fluid couplings and gearing having a plurality of rotatable members, said couplings each having a rotatable pump connected to said input shaft and a turbine, means connecting the turbine of one of said couplings to a plurality of rotatable members of said gearing, means connecting the turbine of another of said couplings to another member of said gearing, an overrunning brake means automatically operable at times to hold a member of said gearing stationary to condition said gearing for one phase of operation, and means drivingly connecting members of said gearing to said output shaft, each of said couplings being selectively fillable at will at any speed of said input shaft to render it effective to transmit torque, the selective filling of selected ones of said fluid couplings in different combinations together with the automatic operation at times of said brake means establishing a plurality of different drives through said transmission.

References Cited by the Examiner
UNITED STATES PATENTS

| | | | |
|---|---|---|---|
| 2,284,123 | 5/1942 | Breer et al. | 74—718 |
| 2,521,117 | 9/1950 | Dubois et al. | 74—730 X |
| 2,524,975 | 10/1950 | Hobbs | 74—740 |
| 2,602,353 | 7/1952 | Keller | 74—677 |
| 2,873,618 | 2/1959 | DeLorean | 74—732 X |
| 2,968,197 | 1/1961 | DeLorean | 74—732 X |
| 3,084,568 | 4/1963 | O'Malley | 74—678 |
| 3,147,635 | 9/1964 | Fisher | 74—677 X |

DON A. WAITE, *Primary Examiner.*